United States Patent [19]

Kim et al.

[11] Patent Number: 4,476,246

[45] Date of Patent: Oct. 9, 1984

[54] DOUBLY PROMOTED PLATINUM GROUP METAL CATALYSTS FOR EMISSION CONTROL

[75] Inventors: Gwan Kim, Olney; Michael V. Ernest, Catonsville, both of Md.

[73] Assignee: W. R. Grace & Co., New York, N.Y.

[21] Appl. No.: 461,119

[22] Filed: Jan. 26, 1983

[51] Int. Cl.$^3$ .................. B01J 21/04; B01J 23/10; B01J 23/58
[52] U.S. Cl. ................... 502/304; 423/213.5
[58] Field of Search ............ 252/462; 423/213.5; 502/304

[56] References Cited

U.S. PATENT DOCUMENTS

| | | |
|---|---|---|
| 3,755,556 | 8/1973 | Aldridge et al. . |
| 3,903,020 | 9/1975 | Sergeys et al. ............... 252/455 R |
| 3,932,309 | 1/1976 | Graham et al. ............... 252/439 |
| 3,993,572 | 11/1976 | Hindin et al. ............... 252/462 |
| 4,051,073 | 9/1977 | Hegedus et al. ............ 252/466 PT |
| 4,054,644 | 10/1977 | Segura et al. . |
| 4,140,749 | 2/1979 | Baresel et al. ............... 423/213.5 |
| 4,179,408 | 12/1979 | Sanchez et al. ............... 252/448 |
| 4,369,132 | 1/1983 | Kinoshita et al. ............ 252/462 X |

FOREIGN PATENT DOCUMENTS 56-102940  8/1981  Japan .

OTHER PUBLICATIONS

Kim, "Ceria-Promoted Three-Way Catalysts for Auto Exhaust Emission Control", Ind. Eng. Chem. Prod. Res. Dev., vol. 21, No. 2, (1982), pp. 257–274.
Barber et al., Three Way Catalysts: Screening for Wide Window Performance, AIChE 91st National Meeting, Paper No. 30a, (Aug. 19, 1981).
Exposed Aluminum Ions as Active Sites on $\gamma$-Alumina, J. H. Lunsford, L. W. Zingery and M. P. Rosynek, Journal of Catalysis 38, 1975, pp. 179–188.
Development of More Active and Durable Automotive Exhaust Catalysts, Michael V. Ernest and Gwan Kim, SAE Technical Paper Series 800083, Feb. 25–29, 1980, pp. 1–12.

*Primary Examiner*—W. J. Shine
*Attorney, Agent, or Firm*—Edward J. Cabic

[57] ABSTRACT

Catalysts are made from supports which are doubly promoted with ceria and an alkali metal oxide by adding these promoters and the catalytic noble metal components in a specified order. The ceria is first applied to the support. It can be applied in a salt form such as cerous nitrate. This impregnated support is then calcined to form a deposit of ceria. Next, solutions bearing the noble metals are applied to the ceria-promoted support and with these solutions the alkali metal component is applied. After subsequent elevated temperature activation, the alkali metal component is converted to an alkali metal oxide and the noble metals are converted into their metallic or oxide form.

When lithium is chosen as the alkali metal promoter, it can alternatively be applied to the support along with the initial ceria promoter. After calcining the support to yield the ceria and lithia promoters, the noble metals can then be deposited and subsequently activated at an elevated temperature. Using this process it is possible to have the noble metals deposited on the support so that their penetration depth is less than 300 microns as measured by the $SnCl_2$ solution staining method to provide an effective three-way catalyst suitable for use in auto emission control.

27 Claims, No Drawings

DOUBLY PROMOTED PLATINUM GROUP METAL CATALYSTS FOR EMISSION CONTROL

BACKGROUND OF THE INVENTION

1. Field of the Invention

This invention relates to a method of making a catalyst which is suitable for use as a three-way catalyst for auto emission control and to the resulting catalyst.

2. Description of the Previously Published Art

Even with the computer-controlled system, the success of the current single bed approach to the simultaneous control of HC, CO, and $NO_x$ emissions from automobile exhaust depends largely on how successfully one could design a practical three-way catalyst (TWC) with a large TWC "window". Because the size of TWC window is determined mainly by the CO conversion on the rich side ($O_2$-deficient) and the $NO_x$ conversion on the lean side ($O_2$-excess), suitable promoters that enhance these conversions will lead to a significant improvement in tne performance of catalytic converters.

The CO removal from automobile exhaust under rich conditions is highly dependent on the catalyst efficiency for the water-gas shift (WGS) reaction, $CO + H_2O = CO_2 + H_2$. It is known (G. Kim, "Ceria-Promoted Three-Way Catalysts for Auto Exhaust Emission Control," Ind. Eng. Chem. Prod. Res. Dev., 1982, 21, 267) that the WGS reaction is substantially enhanced on the supported Pt group metal TWCs when promoted by ceria which is moderately basic but which is also a strong Lewis acid. It is also known from Clyde L. Aldridge in U.S. Pat. No. 3,755,556 and Marnell A. Segura et al in U.S. Pat. No. 4,054,644 that the WGS reaction can be promoted by the presence of alkali or alkali earth metals which are strong bases. Ceria-promoted catalysts as taught by Sergeys, Maselli and Ernest in U.S. Pat. No. 3,903,020 and by Hindin and Dettling in U.S. Pat. No. 3,993,572 have been introduced for auto exhaust emission control. Alkali metal-promoted catalysts as taught by Baresel, Scharner, and Huth in U.S. Pat. No. 4,140,749 and by Barber, Lostaglio, and Shukis in their paper "Three Way Catalysts: Screening for Wide Window Performance," as presented at the 91st National Meeting of AIChE, Detroit, Michigan (August, 1981) have also been introduced for auto exhaust emission control. However, few catalysts have been tried with both alkali metals together with ceria.

The only publication found which uses alkali metals with ceria is the Toyota Motor Japanese patent Publication JP-004130 "Purification Catalyst for Motor Car Gas Exhaust" (1/18/80) which is U.S. Pat. No. 4,369,132. The problem they were addressing was to improve the low temperature performance of a catalyst that was mainly platinum. In other words, they were just concerned with improving the warm-up characteristic of the catalyst. The addition of ceria is said to be optional and there is no indication that any of the alkali metals are preferred. The testing undertaken was under mild conditions to only measure the temperature for 50% conversion. The patentees were not concerned with the problem of making a catalyst that would work well after operating for a substantial period of time. They did not measure the steady-state conversion efficiency nor did they use any accelerated aging techniques. Instead of using a high level poison containing fuel, they just used a commercial unleaded gasoline available from the market in their 30-hour aging in a multi-cell unit. Thus, their results cannot predict the expected performance of their catalysts after further extended period of aging beyond 30 hours. It should be pointed out that a catalyst with a decreased temperature for 50% conversion does not necessarily exhibit a high level of conversion under steady-state conditions. As will be shown in the following examples, the catalysts made according to the present invention have superior steady-state performance compared to the catalysts made according to this Toyota disclosure.

3. Objects of the Invention

It is an object of this invention to provide a method of producing a highly durable catalyst suitable for use as a three-way catalyst for auto emission control having good steady-state efficiency after a sufficiently long period of aging.

It is a further object of this invention to produce a catalyst which is doubly promoted with ceria and an alkali metal in a manner which permits the effective addition of noble metals to provide good steady-state efficiency when used for auto emission control.

It is a further object of this invention to produce a catalyst suitable for use as a three-way auto emission catalyst where ceria is initially deposited on the support followed by the addition of an alkali metal and one or more noble metals.

It is a further object of this invention to produce a catalyst suitable for use as a tnree-way auto emission catalyst where ceria and lithia are first deposited on a support followed by the addition of one or more noble metals.

These and further objects will become apparent as the description of the invention proceeds.

SUMMARY OF THE INVENTION

Catalysts suitable for use as three-way catalysts for auto emission control are made from supports which are doubly promoted with ceria and an alkali metal oxide by adding these promoters and the catalytic noble metal components in a specified order. Under the broad aspect of the invention, the alkali metal component is added along with the noble metal after the ceria has been applied. In other words, the ceria is first applied to the support such as in a salt form. For example, cerous nitrate can be applied as an aqueous solution and then the impregnated support is calcined to form a deposit of ceria. When the solutions bearing the noble metals are subsequently applied to the ceria-promoted support the alkali metal component can also be applied. After subsequent elevated temperature activation, the alkali metal component is converted to an alkali metal oxide and the noble metals are converted into their metallic or oxide form.

A further aspect of the invention is that when lithium is chosen as the alkali metal promoter, it can be applied to the support along with the ceria promoter. After the subsequent calcination of the support to yield the ceria and lithia promoters, the noble metals can be deposited and subsequently activated at an elevated temperature.

By the proper addition of the two promoters it is possible to have the noble metals deposited on the support so that their penetration depth is less than 300 microns as measured by the $SnCl_2$ solution staining method.

DESCRIPTION OF THE PREFERRED EMBODIMENTS

As disclosed in the examples below, the three-way catalysts of this invention require certain methods of preparation in order for the resulting catalyst to exhibit improved performance and durability. Two different procedures, one (Procedure A) involving the alkali metals in general, the other (Procedure B) specifically for Li, essentially consist of the following steps:

Procedure A (1) Promote alumina pellets with ceria to 1-10 wt. % $CeO_2$, preferably to 2-6 wt. % $CeO_2$, by an impregnation of 950°-1050° C. calcined alumina with a cerous nitrate solution, followed by 100°-150-° C. drying and 500°-800° C. air calcination, or by an impregnation of 300°-600° C. activated alumina with a cerous nitrate solution, followed by 100°-150° C. drying and 950°-1050° C. air calcination.

(2) Impregnate the ceria-promoted alumina pellets with solutions bearing noble metals, preferably in the form of sulfito complex ions, along with any of the water-soluble alkali metal compounds, usually in multiple steps of impregnation, out avoiding an exposure to 250° C. or higher temperatures before all the noble metals are impregnated.

(3) After 100°-150° C. drying, activate the catalyst in flowing $N_2$ containing 2-5 vol. % $H_2$ at 250°-550° C., preferably at approximately 400° C.

Procedure B (1) Promote alumina pellets with both ceria and lithia to 1-10 wt. % $CeO_2$, preferably 2-6 wt. % $CeO_2$ and up to 5 wt. % $Li_2O$, preferably from 0.5 to 3 wt. % $Li_2O$, by an impregnation of 400°-450° C. activated alumina pellets with a solution containing both cerous nitrate and lithium nitrate, followed by 100°-150° C. drying and 950°-1050° C. air calcination.

(2) Impregnate the ceria-lithia-promoted alumina pellets with solutions bearing noble metals, preferably in the form of sulfito complex ions, usually by multiple impregnations.

(3) Identical to (3) in Procedure A.

The difference in these two procedures resides in when the calcination of the alkali metal takes place. In Procedure B when lithia is used as the promoter, it is possible to initially add the lithia along with the ceria and to calcine the lithia prior to adding the noble metals. As will be demonstrated in the examples to follow, this calcined lithia does not render the surface too basic so as to adversely affect the subsequent deposition of the noble metals. Such a procedure of initially adding the alkali metal cannot be used with alkali metals other than lithium because they render the catalyst surface too basic which in turn does not permit the noble metals to be subsequently applied in the desired manner with the proper controlled degree of penetration. Thus, when alkali metals other than lithium are used as promoters with ceria, it is necessary to follow Procedure A in which the ceria is first applied and calcined and then the alkali metal is added along with the noble metals under controlled conditions during the impregnation.

The use of $CeO_2$ has been known to improve the WGS reaction. It has now been found that the ceria-promoted catalyst can be further promoted by adding an alkali metal oxide for use in an improved three-way catalyst (TWC). This superiority will be demonstrated in the following examples and especially with respect to just a ceria-promoted catalyst. It has further been found that the use of the catalyst doubly promoted with alkali metal oxide and ceria will also further promote the conversion of CO via the direct oxidation with oxygen, $2CO+O_2=2CO_2$. This reaction is illustrated in Example 13 infra.

The role of ceria is apparently not limited to just promoting CO reactions with both $O_2$ and $H_2O$. Ceria is known to provide oxygen storage capacity to the catalyst. Our data on the doubly promoted TWC in Example 14 suggest that the strong Lewis acid sites of ceria may also be acting as an $H_2S$ sink, thereby alleviating the sulfur poisoning effect especially on the WGS reaction. Hydrogen sulfide is formed over TWCs as a result of reaction between $H_2$ and $SO_2$, both of which are present in the engine exhaust gas. It is known from J. H. Lunsford et al. in J. of Catalysis, 38, 179 (1975) that the Lewis acid sites of the alumina surface are capable of selectively adsorbing $H_2S$ from a mixture of $H_2S$ and $H_2O$. Ceria is known to be one of the strongest solid Lewis acids.

The superiority of the doubly promoted TWCs, especially one promoted with lithia-ceria, over those singly promoted with either ceria or alkali metal oxide(s) can be readily seen in the examples below. This is further demonstrated regardless of the physical form of the catalyst, pellets or monolith, as shown in Examples 15-17.

Although not wanting to be limited to any scientific theory, it is quite probable that the superiority of lithia-ceria promoter over other alkali metal oxides-ceria combinations is due, in part, to the fact that lithium is more like magnesium in chemical behavior ranking it the least basic of all the alkali metals. As reported by G. Kim in Ind. Eng. Chem. Prod. Res. Dev., 21, 267 (1982) the more basic the surface the lower the HC conversion efficiency of the TWC.

Whether the surface is more or less basic will have an effect on how far the noble metal complex will penetrate into the support. See, for example, Hegedus et al U.S. Pat. No. 4,051,073 which discusses the significance of catalytic metal penetration. By following the procedure according to the present invention the noble metals penetrate the support to a distance of less than 300 microns as measured by the $SnCl_2$ solution staining method. This method involves treating the catalyst in a boiling solution of $SnCl_2$ which turns the catalytic material black for good visualization. The penetration of the catalytically active materials is determined by microscopic examination of a cross-section of the catalyst against a micron scale.

When making alumina particle catalysts the amount of $CeO_2$ promoter applied is preferably between 1 to 10 wt. % and more preferably between 2-6 wt. %. The amount of alkali metal promoter applied expressed as the weight percent of the oxide $M_2O$, may be any effective amount up to about 5 wt. % and more preferably from about 0.5 to 3 wt. %.

The platinum group metal component may be platinum, palladium, rhodium, ruthenium, iridium, osmium, and mixtures thereof, with the preferred metals being Pt, Pd, Rh either alone or in any combination. In one embodiment both platinum and palladium are present. When the platinum group metal contains more than one of such components, the component may be composed of a major amount of platinum or palladium and a minor amount of one or more of the other platinum group metals such as rhodium. The catalytic metals mixture may comprise from about 1 to about 10 wt. % rhodium and from about 90 to about 99 wt. % platinum, palladium, or mixtures thereof and preferably about 5 wt. % rhodium and about 95 wt. % platinum, palladium, or mixtures thereof.

Various compounds, complexes, or fine metal dispersions of any of the platinum group metals is aqueous or organic mediums may be used to achieve deposition of the platinum group metal component on tne composite. A suitable liquid medium will not react with the platinum group metal component and is removable on drying whicn can be accomplished as part of the preparation or in use of the catalyst. Water soluble platinum group metal compounds or complexes may conveniently be used. Suitable platinum group metal compounds include chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

In a preferred embodiment of this invention, the impregnation solution contains an ammonium sulfito complex of platinum group metal prepared according to the methods described in U.S. Pat. No. 3,932,309 to Graham et al. The use of these complexes provides excellent dispersion and control of penetration depth of the platinum group metal. Preferably, rhodium is incorporated in the catalyst by impregnation with an acid rhodium sulfito complex prepared by reacting rhodium trichloride or rhodium hydrous oxide with sulfurous acid.

After the impregnations are completed, the composition may be dried, for example, at a temperature of from about 100° C. to about 150° C. for about 2 to about 20 hours. The salt composition may be decomposed and tne catalyst activated under conditions which provide a composition having characteristics that promote the desired reaction. The temperature of this activation is low enough to permit neither noble metal sintering nor sintering of the support. It is preferably done in a reducing atmosphere, e.g., by about a 1 hour reduction in flowing nitrogen containing 5 volume percent hydrogen at about 250°–550° C. and more preferably at about 400° C.

In the catalyst of this invention, the platinum group metals are promoters for oxidation, reduction and decomposition reactions and are present in amounts sufficient to provide catalytic compositions having significant activity for catalyzing these reactions. Generally, the amount of platinum group metal used is a minor portion of the catalyst composite and typically does not exceed about 10 weight percent of the calcined composite. The amount may be about 0.05 to 10 percent and is preferably about 0.1 to 6 percent based on the weight of the calcined composite to maintain good activity with prolonged use.

The alumina support can be either in a shaped form such as a pellet or as an alumina powder.

Having described the basic aspects of the invention, the following examples are given to illustrate specific embodiments thereof.

EXAMPLE 1

This example reveals the effect of various alkali-metal promoters on the removal of CO via the WGS reaction.

Grace alumina beads made according to the procedure in the M. G. Sanchez and N. R. Laine U.S. Pat. No. 4,179,408, hereafter referred to as simply alumina, were calcined for 1 hour in 1010° C. air. Six portions of the resulting beads in the 5–10 mesh range were impregnated to incipient wetness with a nitrate solution bearing one or more of the desired promoter metals, dried in 135° C. air, and then exposed to 730° C. air for 1 hour. For example, Support C in Table 1 was prepared as follows. In about 100 ml of water was dissolved 4.57 g of sodium nitrate crystals with 99.9% assay. To this was added 25.00 g of a cerous nitrate stock solution containing 0.200 g of $CeO_2$ per gram solution. The resulting mixed nitrate solution was diluted with water to 140 ml. This solution was sprayed onto 163.3 g of the above calcined alumina beads, dried, and air calcined. The resulting bead supports had bulk densities and water pore volumes shown in Table I.

TABLE I

| | Catalyst Performance for the Water-Gas Shift Reaction at 460° C. and Approximately 60,000 GHSV | | | | |
|---|---|---|---|---|---|
| | | Support | | | Catalyst |
| Catalyst No. | Support No. | Bulk Density (g./cc.) | Water Pore Volume (cc./g.) | Promoters (Wt. %) | Activity (% CO Converted) |
| 1A | A | 0.477 | 0.920 | 3% $CeO_2$ | 8 |
| 1B | B | 0.458 | 1.00 | 1% $Na_2O$ | 11 |
| 1C | C | 0.476 | 0.954 | 1% $Na_2O$ + 3% $Ce_2O$ | 17 |
| 1D | D | 0.477 | 0.971 | 1.52% $K_2O$ + 3% $CeO_2$ | 16 |
| 1E | E | 0.488 | 0.912 | 6% $CeO_2$ | 14 |

A 300 ml batch of Pt-Pd-Rh catalyst was prepared from each of the above prepared supports, based on an identical metals loading in g/liter of 0.569 Pt, 0.225 Pd, and 0.0712 Rh. The preparation of impregnating solutions and the general procedure are described below.

For palladium, a palladium nitrate solution bearing 0.555 g of Pd was added at room temperature to approximately 130 grams of sulfurous acid containing 1.50 grams of $SO_2$ in a bottle, with gentle agitation. After dilution with water to exactly 185 grams, the bottle was sealed off. The resulting sulfito complex solution contains 3 mg Pd per gram of solution. This solution is hereafter referred to as Solution A.

For platinum, an aqueous ammonium bisulfite solution in an amount of approximately 275 g containing 35.4 millimoles of ammonium bisulfite had its pH raised to 8.6 by adding an ammonium hydroxide solution. To this was slowly added in small portions, with stirring, 6.497 g of chloroplatinic acid solution bearing 1.380 g of Pt. After dilution to exactly 460 g, the solution was allowed to stand at room temperature for about one hour to obtain a colorless solution of ammonium tetrasulfito complexes of Pt. This solution containing 3 mg Pt per gram solution is hereafter referred to as Solution B.

For rhodium, a dilute sulfurous acid solution containing 0.375 g $SO_2$ was contacted at room temperature with a hydrochloric acid solution of rhodium trichloride bearing 200 mg Rh, and was diluted to exactly 100 g. The solution in a bottle was sealed, and soaked in 60° C. water for one hour. The resulting sulfito complex solution contains 2 mg Rh per gram solution. This solution is hereafter referred to as Solution C. A 300 ml batch of beads were impregnated to 90% of incipient wetness by spraying with a palladium solution providing 67.6 mg of Pd. This solution was prepared by adding 0.75 millimole of dibasic ammonium citrate, i.e., 7.5 ml of 0.1M solution to 22.54 g of Solution A and then diluting with water to 90% of total water pore volume. The impregnated beads were then dried for 3 hours in 135° C. air. The beads were reimpregnated to 85% of incipient wetness with a Pt-Rh combined solution formed by mixing 57.00 g of the Solution B bearing 171 mg of Pt along with 10.68 g of the Solution C containing 21.4 mg of Rh, and then diluting to an appropriate volume. The pH of this Pt-Rh impregnating solution was adjusted with $NH_4OH$ to approximately 2.1 before dilution. After drying in 135° C. air, the beads were activated by 1 hour reduction in flowing nitrogen containing 5 vol. % hydrogen at approximately 380° C.

Because the primary purpose of the promoters is to enhance the catalyst performance for CO removal especially under $O_2$-deficient conditions, each of the above catalysts was tested for CO removal via the water-gas shift reaction. The catalyst evaluation was carried out in a Vycor glass reactor with 8.5 ml sample at 460° C and approximately 60,000 GHSV, using a test feed consisting of 1% CO, 10% $H_2O$, 14.5% $CO_2$, and balance nitrogen. The % CO disappeared under steady-state conditions was taken as a measure of catalyst activity.

The results in Table I clearly reveal the fresh catalyst activity for CO removal via WGS reaction to be more effectively enhanced by incorporating 1 wt. % $Na_2O$ as a secondary promoter in addition to 3 wt. % $CeO_2$, the primary promoter, than doubling the level of the primary promoter to 6 wt. % $CeO_2$. In other words, Catalyst 1C with the combination of 1% $Na_2O$ and 3% $CeO_2$ has an activity value of 17 which is greater than the value of 14 for double the amount of $CeO_2$ in Catalyst 1E.

Obviously, however, with these fresh activity data alone, one cannot predict the durabilities of such doubly promoted catalysts in an actual auto exhaust environment. To show this, one must look at aging tests and the catalyst performance after aging as shown in Tables III and IV infra.

The following Examples 2–6 describe the preparation of various catalysts, according to Procedure A or B, which will be subjected to accelerated aging in Example 7.

EXAMPLE 2

A separate 8066 gram batch of alumina beads promoted with 6 wt. % $CeO_2$ essentially identical to Support E in Table I, having a bulk density of 0.4906 g/cc and a water pore volume of 0.93 cc/g was doubly impregnated, first with a solution prepared by adding 182 g of sulfurous acid (containing 6.34 wt. % $SO_2$) to 5 liters of water, followed by 51.59 g of $Pd(NO_3)_2$ solution (containing 7.863 wt. % Pd) and 9.297 grams of dibasic ammonium citrate and subsequent dilution to 6751 ml. The solution was then sprayed onto the support in a rotary mixer using atomizing nozzles. After drying at 135° C. for 16 hours, the beads were reimpregnated with a solution containing both Pt and Rh.

The Pt-containing solution was prepared by a dilution of 58.2 g of ammonium bisulfite (46.47% $NH_4HSO_3$) to 3.0 liters, followed by raising the pH from 5.82 to 9.00. The addition of 47.74 g of chloroplatinic acid (containing 21.24 wt. % Pt) to this solution resulted in a decreased pH initially to 3.4 and then to 2.65 in 1.75 hours, when the solution appeared nearly colorless.

This Pt-containing solution was combined with a Rh-containing solution prepared by contacting 10.434 ml of rhodium trichloride solution (containing 48.6 mg Rh per ml) with 15.7 g of sulfurous acid (containing 6.34 wt. % $SO_2$) in a total volume of 250 ml at 60° C. for one hour.

The platinum and rhodium sulfito complex solutions were combined with 4.10 ml of rhodium nitrate solution (containing 23.67 mg Rh per ml) and then diluted to 6.00 liters. The resulting solution had a pH of 2.2.

The resulting solution was impregnated by spraying, followed by 135° C. drying for 16 hours. The catalyst was then reduced in flowing $N_2$ containing 5 vol. % $H_2$ at 385–400° C. for one hour. This catalyst was formulated to have the following metals loading (g metal/liter): 0.593 Pt, 0.237 Pd, and 0.0593 Rh, allowing 4% excess for each metal to compensate for potential losses in actual preparation.

EXAMPLE 3

Alumina beads were calcined for one hour in 1052°–1066° C. air. 1000 grams of the resulting beads in the 5–10 mesh range, having 1.00 ml water pore volume, 2.64 wt. % total volatiles, and 120 $m^2/g$ B.E.T. ($N_2$) surface area, were impregnated to incipient wetness with a solution of 55.2 g of sodium nitrate (99.2% assay) diluted to 1.00 liter. It was air dried at room temperature for ½ hour before being oven dried at 135° C. It was then calcined in 704° C. air for one hour. The resulting support formulated to contain 2 wt. % $Na_2O$ had the following properties: 0.4762 g/cc bulk density, 1.04 cc/g water pore volume, 94 $m^2/g$ BET ($N_2$) surface area, and no alpha alumina based on X-ray diffraction. A 300 ml batch of this support was converted to the Pt-Pd-Rh catalyst described in Example 1 in exactly the same manner.

EXAMPLE 4

Alumina beads in the 5–10 mesh range that has been thermally stabilized by 1 hour air calcination at 1010° C. were impregnated to incipient wetness with a solution of cerous nitrate and sodium nitrate, dried at 135° C., and then exposed to 730° C. air for one hour. The resulting beads containing 2 wt. % $Na_2O$ and 3 wt. % $CeO_2$ had a bulk density of 0.475 g/cc and a water pore volume of 0.960 cc/g. A 300 ml batch of this support was converted to the Pt-Pd-Rh catalyst described in Example 1 in exactly the same manner.

EXAMPLE 5

A 300 ml batch of Support A described in Table I was converted to a Pt-Pd-Rh catalyst based on the same metals loading as described in Example 1, using the same procedure, with one exception. Namely, the first impregnating solution contained 7.85 grams of sodium nitrate in addition to Pd required.

EXAMPLE 6

A 300 ml batch of Support A described in Table I was converted to a Pt-Pd-Rh catalyst based on the same metals loading as described in Example 1, using the same procedure, with one exception. Namely, the second impregnating solution had 7.85 grams of sodium nitrate in addition to Pt and Rh required.

EXAMPLE 7

An 8.5 ml sample each of the above catalysts was subjected to accelerated aging on a pair of pulse flame combustors or "pulsators" for a period of 45 hours, at approximately 60 pulses/minute using n-hexane containing 0.053 g/liter Pb, 0.132 g/liter P, and 0.08 wt. % S. During the period of aging the catalyst samples were allowed to experience cycling temperatures. The cycle consisted of a low temperature of 593° C. which was maintained for 60 minutes and then a higher temperature of 816° C. which was maintained for 30 minutes. Each catalyst was then evaluated by a "cycled TWC test" as described by M. V. Ernest and G. Kim in Soc. of Automot. Eng. Paper No. 800083 at approximately 92,000 GHSV, using the test feed shown in Table II at 482° C. inlet gas temperature.

TABLE II

Composition of Test Feed Gas in "Cycled TWC Test"

| Gaseous Component | Rich Stream | Lean Stream | Cycled[a] Stream |
|---|---|---|---|
| $C_3H_6$ | 0.027 | 0.027 | 0.027 |
| $C_3H_8$ | 0.009 | 0.009 | 0.009 |
| CO | 0.72 | 0.29 | 0.376–0.694 |
| $H_2$ | 0.24 | 0.10 | 0.128–0.232 |
| NO | 0.162 | 0.162 | 0.162 |
| $O_2$ | 0.20 | 0.70 | 0.230–0.60 |
| $CO_2$ | 14.5 | 14.5 | 14.5 |
| $H_2O$ | 10 | 10 | 10 |
| $N_2$ | Balance | Balance | Balance |

[a] Cycled between the rich and lean streams at 1 Hertz varying the proportions.

The results presented in Table III represent TWC performance under a lean (R=1.5), stoichiometric (R=1.0), and a rich (R=0.7) conditions, where R is a measure of air/fuel ratio defined as the ratio of total oxidant ($O_2$ and NO) to total reducing agent (HC, CO, and $H_2$) in the test feed, each entity being expressed in terms of $O_2$ equivalent.

These performances are higher than the value of 52.5% for double the amount of $CeO_2$ (i.e. 6%) in Catalyst 2 or for the value of 54 for the 2% $Na_2O$ in Catalyst 3.

The data further show that there is a preferred method of incorporating catalytic metals and promoters when one is concerned with the HC conversion. When using alkali metal promoters other than lithium, it is advantageous to follow Procedure A where the ceria is first applied and calcined and then the alkali metal is added under relatively low temperatures with the noble metal. In Catalysts 5 and 6 this Procedure A is followed and the HC conversions under the stoichiometric condition (R=1.0) are 63% and 68%. However, for Catalyst 4 when the same amount of $Na_2O$ is added initially along with the $CeO_2$ and then calcined prior to the subsequent addition of the noble metals, the HC conversion falls off to 52%. Although not wanting to be limited to any scientific theory, it is believed that when the alkali metal salts are applied prior to noble metal impregnation and calcined, the support surface becomes strongly basic. As a consequence, the anionic noble metal complex such as the sulfito complex ions tend to penetrate rather too deeply into the pores where they are not effective in HC conversion. The answer to this problem is to follow Procedure A as illustrated by the catalysts made in Examples 5 and 6 where the alkali metals are incorporated into the catalyst as the noble metals are impregnated in a multiple impregnation scheme.

The catalyst samples were examined under the microscope for the metals penetration depth using the $SnCl_2$ staining method. All the alkali metal-containing catalysts showed very deep metals penetration, with depths substantially greater than 150 microns. The metals in Catalyst 3 were found to be so deeply diffused that no penetration depth could be estimated, whereas Catalyst 2 with only $CeO_2$ showed approximately 150 micron depth in metals penetration which is closer to the desired depth for a pelleted auto exhaust catalyst.

Because of this very deep metals penetration, catalysts containing alkali metals prepared by Procedure B are bound to exhibit poor HC performance, as shown in Table III above, with the exception being a catalyst containing Li prepared by Procedure B as will be demonstrated below in Table IV.

The following Examples 8 and 9 describe the preparation of metal oxide-promoted supports utilizing Pro-

TABLE III

Performance of Pulsator-Aged Catalysts in Cycled TWC Tests[a] at Approximately 92,000 GHSV

| Catalyst In Example | Procedure[b] | Promoters (wt. %) | Impreg. Includes | Rich (R = 0.7) HC | CO | NO | Stoichiometric (R = 1.0) HC | CO | NO | Lean (R = 1.5) HC | CO | NO |
|---|---|---|---|---|---|---|---|---|---|---|---|---|
| 2 | — | 6% $CeO_2$ | | 52 | 52.5 | 73.5 | 64.5 | 84.5 | 72.5 | 63 | 92 | 45.5 |
| 3 | B | 2% $Na_2O$ | | 40 | 54 | 78 | 55 | 83 | 72.5 | 53 | 93 | 52 |
| 4 | B | 2% $Na_2O$ 3% $CeO_2$ | Na—Ce Coimp. | 30 | 59 | 71 | 52 | 88 | 68 | 53 | 92 | 48 |
| 5 | A | 2% $Na_2O$ 3% $CeO_2$ | Pd—Na Coimp. | 42 | 60 | 77 | 63 | 90 | 72.5 | 62 | 93.5 | 51 |
| 6 | A | 2% $Na_2O$ 3% $CeO_2$ | Pt—Na Coimp. | 48 | 61 | 83 | 64 | 89 | 77 | 63 | 96 | 55 |

[a] The values for HC, CO and NO are the percent conversion of these three components. The higher the value the better.
[b] Procedure as defined in the Description of the Preferred Embodiment.

The data clearly reveal that the presence of both ceria and alkali metals is more effective for enlarging the TWC window than having only one of the promoters. For example, in the rich phase for catalysts 4, 5 and 6 which each have 2% $Na_2O$ and 3% $CeO_2$ their CO converstions are 59%, 60% and 61% respectively.

cedure B with Example 8 being according to the present invention and Example 9 being a comparison example. Also included is a control sample, Example 10, which is not a doubly promoted catalyst. These supports were made into catalysts in Example 11 and were subjected to an accelerated aging test in Example 12.

EXAMPLE 8

Alumina beads were activated in 427° C. air for 16 hours, and sifted through 5 and 10 mesh sieves. 1000 grams of the activated beads were impregnated to full incipient wetness with a solution prepared by dissolving 99.57 g of $LiNO_3$ (99.5% assay) in water and combining with 130.11 g of hydrous $Ce(NO_3)_3$ having a $CeO_2$ concentration of 23.8789 wt. % and then diluting the mix to 1060 ml with water. After impregnation the support was dried at 135° C. The dried support was air calcined at 1038° C for one hour. The resulting support had a bulk density of 0.4841 g/cc, a water pore volume of 0.95 cc/g, and a BET ($N_2$) surface area of 90 m2/g. This support was formulated to contain 3 wt. % $CeO_2$ and 2 wt. % $Li_2O$.

EXAMPLE 9

A 1000 gram batch of the activated alumina beads in the 5-10 mesh range described in Example 8 was impregnated in the same manner to full incipient wetness with a solution prepared by dissolving 56.8 g of $NaNO_3$ (99.2% assay) in water and combining with 130.11 g of aqueous $Ce(NO_3)_3$ having a $CeO_2$ concentration of 23.878 wt. % and then diluting the mix to 1060 ml with water. After impregnation the support was dried at 135° C. The dried support was air calcined at 1038° C. for one hour. The resulting support had a bulk density of 0.4696 g/cc, a water pore volume of 0.95 cc/g, and a B.E.T. ($N_2$) surface area of 104 m2/g. This support was formulated to contain 3 wt. % $CeO_2$ and 2 wt. % $Na_2O$.

EXAMPLE 10

A large batch of the activated alumina beads in the 5-10 mesh range described in Example 8 was impregnated with a cerous nitrate solution in exactly the same manner as in Examples 8 and 9, dried in 135° C. air, and air calcined at 1038° C. for one hour. The resulting beads containing 6 wt. % $CeO_2$ had a bulk density of 0.489 g/cc, a water pore volume of 0.95 cc/g, and a BET ($N_2$) surface area of 113m2/g.

EXAMPLE 11

The supports obtained in Examples 8, 9 and 10, in an amount of 400 ml each were converted to the Pt-Pd-Rh catalyst described in Example 1, using essentially the same procedure as in Example 1 with two minor differences. First a 4% excess amount of noble metals were used in actual preparation to compensate for potential losses, and second the palladium sulfito complex solution was prepared from an $H_2SO_3$ solution prepared by bubbling pure $SO_2$ gas through a fritted glass dispersion tube at a rate of 3 millimoles $SO_2$ per minute into approximately 75% of the desired volume of the aqueous impregnating solution rather than using a ready made sulfurous acid.

EXAMPLE 12

An 8.5 ml sample each of the above three catalysts described in Example 11 was aged on another pair of pulsators at approximately 90 pulses per minute using the same fuel mix described in Example 7. During the period of aging the catalyst samples were allowed to experience cycling temperatures. The cycle consisted of a lower temperature of 593° C. which was maintained for 75 minutes and then a higher temperature of 816° C. which was maintained for 15 minutes. This cycle was continued and each catalyst was evaluated after 0, 45, 90, and 135 hours of aging according to the cycled TWC test procedure described in Example 7. TWC performance data obtained before and after the 135 hours of aging are presented in Table IV and the catalyst performance in oxidizing warm-up tests as described by M. V. Ernest and G. Kim in Soc. Automot. Eng. Paper No. 800083 are summarized in Table V.

TABLE IV

Performance of Pulsator-Aged Catalysts[a] in Cycled TWC Tests[b] at Approximately 92,000 GHSV

| Support In Example | Procedure[c] | Promoters (Wt. %) | Aged (Hrs) | Rich (R = 0.7) | | | Stoichiometric (R = 1.0) | | | Lean (R = 1.5) | | |
|---|---|---|---|---|---|---|---|---|---|---|---|---|
| | | | | HC | CO | NO | HC | CO | NO | HC | CO | NO |
| 8 | B | 2% $Li_2O$ | 0 | 60 | 50 | 93 | 90 | 85 | 92 | 93 | 99 | 68 |
| | | 3% $CeO_2$ | 135 | 32 | 38 | 60 | 64 | 88 | 72 | 62 | 96 | 46 |
| 9 | B | 2% $Na_2O$ | 0 | 70 | 64 | 99 | 92 | 98 | 97 | 85 | 99 | 68 |
| | | 3% $CeO_2$ | 135 | 18 | 42 | 29 | 42 | 85 | 45 | 50 | 94 | 42 |
| 10 | — | 6% $CeO_2$ | 0 | 49 | 58 | 92 | 85 | 91 | 92 | 93 | 100 | 68 |
| | | | 135 | 30 | 38 | 47 | 52 | 79 | 62 | 53 | 88 | 41 |

[a] Pt—Pd—Rh TWCs in Examples 11 and 12.
[b] The values for HC, CO and NO are the percent conversion of these three components. The higher the value the better.
[c] Description as defined in Preferred Embodiment.

TABLE V

Performance[a] of Fresh and Aged Catalysts[b] in Oxidizing Warm-up Tests at Approximately 38,500 GHSV

| Support in Example | Promoters (Wt. %) | Aged (Hrs.) | Δt (sec) | $t_{50}CO$ (sec) | $t_{50}C_3H_8$ (sec) | Eff. $C_3H_8$ (%) | Eff. CO (%) |
|---|---|---|---|---|---|---|---|
| 8 | 2% $Li_2O$ | 0 | 20 | 53 | 79 | 83 | 99+ |
| | 3% $CeO_2$ | 135 | 53 | 62 | c | 39 | 91 |
| 9 | 2% $Na_2O$ | 0 | 20 | 48 | c | 41 | 99+ |
| | 3% $CeO_2$ | 135 | c | 74 | c | 12 | 87 |
| 10 | 6% $CeO_2$ | 0 | 22 | 49 | 81 | 81 | 99+ |
| | | 135 | c | 64 | c | 40 | 87 |

[a] Δt = Time required to attain 90% conversion from 10% conversion of CO.
$t_{50}$ = Time required to attain 50% conversion.
Eff. = % conversion attained under a steady-state condition.
[b] Pt—Pd—Rh TWCs in Examples 11 and 12.
[c] Unavailable because the % conversion required was not attained.

It is apparent from these data that the catalyst doubly promoted with Li-Ce made by Procedure B far exceeds the aging performance of both Na-Ce-promoted catalyst made by Procedure B or a Ce-promoted catalyst. For example, under the stoichiometric condition (R=1.0) the $Li_2O$-$CeO_2$-promoted catalyst of Example 8 exhibits HC, CO and NO conversion efficiencies of 64%, 88%, and 72%, respectively, after aging for 135 hours. The $Na_2O$-$CeO_2$-promoted catalyst of Example 9, on the other hand, shows much lower performance of 42%, 85%, 45%, respectively, for the three pollutants. The aging performance of $CeO_2$-promoted catalyst at the higher 6% level is substantially lower than that of the fresh $Li_2O$-$CeO_2$-promoted catalyst of the preferred embodiment of this invention in Example 8.

In addition to the superior results of the pulsator-aged catalysts in the cycled TWC tests presented in Table IV, the oxidizing warm-up tests for the fresh and aged catalysts in Table V also shows the better performance of the $Li_2O$-$CeO_2$ catalyst of the preferred embodiment of this invention. The time for 50% conversion of CO after aging for 135 hours was only 62 seconds for the $Li_2O$-$CeO_2$-promoted catalyst whereas for the $Na_2O$-$CeO_2$-promoted catalyst the time was longer, 74 seconds. For the time to go from 10% conversion to 90% conversion of CO, the preferred $Li_2O$-$CeO_2$-promoted catalyst only took 53 seconds after being aged for 135 hours. The other $Na_2O$-$CeO_2$-promoted catalyst did not perform as well after aging, as indicated by the fact that the required 90% conversion level was not attained. Similarly for the singly promoted 6% $CeO_2$-containing catalyst, it also did not achieve 90% conversion after being aged. According to this oxidizing warm-up test data, the HC efficiency for the preferred $Li_2O$-$CeO_2$-promoted catalyst was 83% fresh and 39% after aging whereas the $Na_2O$-$CeO_2$-promoted catalyst has a much lower fresh activity of 41% and aged activity of 12%.

EXAMPLE 13

This example illustrates the advantageous effect of the alkali metal oxides in the oxidation of CO.

Five 300 ml batches of alumina-based bead catalysts were prepared according to Procedure A using the same metals loading as in Example 1. Alkali metals were incorporated along with Pd. An 8.5 ml sample each of these catalysts shown in Table VI was evaluated for the oxidation of CO by $O_2$ under an $O_2$-deficient conditions (R=0.7) at approximately 60,000 GHSV, using a test feed consisting of 1% CO, 0.35% $O_2$ and balance $N_2$. In this evaluation utmost care was taken so as to establish a flat radial temperature profile, $\Delta T$ not exceeding 2° C. between the core of the catalyst bed and the Vycor glass wall. This was done by adjusting both the preheater and an electric heater surrounding the reactor. Furthermore, in order to avoid hysteresis usually associated with transient performance of the catalyst during the heat-up or cool-down test period, the data were taken in a random sequence, allowing sufficient time for the system to reach a steady-state for each set of conditions.

The temperatures for attaining 50% conversion of CO taken from the % CO conversion vs. catalyst bed temperature plots are presented in Table VI. These results clearly establish the fact that alkali metal oxides promote not only the WGS reaction (Example 1) but also the CO oxidation by $O_2$ just like ceria. It should be noted, however, that the alkali metal oxides do not offer any additional oxygen storage capacity to the catalyst.

TABLE VI

| Temperature for 50% CO Conversion under $O_2$-deficient Condition (R = 0.7) | | |
|---|---|---|
| Catalyst No. | Promoters (Wt. %) | °C. |
| 13A | Nil | 301 |
| 13B | 3% $CeO_2$ | 292 |
| 13C | 1% $Li_2O$ 3% $CeO_2$ | 281 |
| 13D | 2% $Na_2O$ | 270 |
| 13E | 2% $Na_2O$ | 267 |

TABLE VI-continued

| Temperature for 50% CO Conversion under $O_2$-deficient Condition (R = 0.7) | | |
|---|---|---|
| Catalyst No. | Promoters (Wt. %) | °C. |
| | 3% $CeO_2$ | |

EXAMPLE 14

This example illustrates the sulfur-sink activity of ceria.

An 8.5 ml each of four of the five catalysts prepared in Example 13 were separately exposed for 30 minutes at about 60,000 GHSV to the following gases at 482° C. (inlet): (a) none, i.e., fresh, (b) 10% $H_2O$ and balances $N_2$, (c) 10% $H_2O$ +450 ppm $H_2$+15 ppm $SO_2$ and balance $N_2$, and (d) 450 ppm $H_2$+15 ppm $SO_2$. The catalyst samples after each separate pretreatment were examined for the WGS reaction at approximately 60,000 GHSV, using a test feed consisting of 1% CO, 10% $H_2O$, 14.5% $CO_2$, and balance $N_2$. The results compared in Table VII were taken from the % CO removed vs. time on stream plots. These data represent % CO conversion recorded 90 seconds after the test for the WGS reaction at 568° C. The data reveal that, (1) while the catalyst promoted singly with 2% $Na_2O$ (catalyst 13D) exhibited the best initial performance with or without 30 minute pretreatment with 10% steam at 482° C., (2) it is the doubly promoted one, with 2% $Na_2O$ and 3% $CeO_2$ (Catalyst 13E), that showed the best initial performance in the WGS reaction when pretreated with gases containing $H_2$+$SO_2$+($H_2O$), i.e., with $H_2S$ in effect. This implies a possible role as an $H_2S$ sink of ceria. These experimental data are further evidence for the fact that doubly promoted catalysts are preferred to those singly promoted with either ceria or alkali metal oxides.

TABLE VII

| Effect of Pretreatment on Catalyst Activity for the WGS Reaction at 568° C. | | | | | |
|---|---|---|---|---|---|
| Catalyst No. | Promoters (Wt. %) | Initial CO Conversion (%)[a] after Pretreatment with | | | |
| | | None | $H_2O$ | $H_2O$ + $H_2$ + $SO_2$ | $H_2$ + $SO_2$ |
| 13A | Nil | 7 | 9 | 8 | 6 |
| 13B | 3% $CeO_2$ | 14 | 17 | 14 | 12 |
| 13D | 2% $Na_2O$ | 63 | 65 | 27 | 17 |
| 13E | 2% $Na_2O$ 3% $CeO_2$ | 54 | 51 | 34 | 26 |

[a]90 seconds after the WGS reaction was allowed to start.

Examples 15 and 16 illustrate the production of monolith catalysts and Example 17 presents their aging performance.

EXAMPLE 15

Transitional (predominantly theta) alumina powder having 160 m²/g surface area was prepared by 1 hour air calcination at 860° C. of 180° C.-dried Grace alumina powder as described by M. G. Sanchez and N. R. Laine in U.S. Pat. No. 4,154,812. In order to obtain alumina powder promoted with 10 wt. % $CeO_2$, 205 g of the above calcined alumina powder was impregnated with 312 ml of cerous nitrate solution providing 22.22 g of $CeO_2$. After homogenizing in a sealed polyethylene bag for 1 hour at room temperature, the powder was dried for 3.5 hours at 135° C., and then for 1 hour in 760° C. air. The resulting material had a surface area of 150 m²/g.

A 40.0 g portion of the above ceria-alumina powder was wet ball milled for 20 hours with 125 g of water and 1.5 g of 3N nitric acid. The resulting slip containing 22.0 wt. % solid was double coated onto 2.54 cm dia. × 2.54 cm long cordierite monoliths with 400 cells per square inches, using the usual techniques well known in this art. Namely, going through a sequence of pouring the slip over one end and quickly blowing out the excess with compressed air, and then repeating the same operation over the other end of the monolith. After each coating the monolith was slowly dried at room temperature for at least 1 hour and at least 2 hours at 135° C. before 1 hour setting in 427° C. air.

One end of a monolith with 1.00 g of ceria-alumina washcoat already on was dipped into 1.08 ml of solution bearing 7.18 mg of Pt in the form of $(NH_4)_6 Pt(SO_3)_4$ complex solution and 0.718 mg of Rh in the form of diluted Solution C in Example 1. The other end of the monolith was then dipped into another 1.08 ml of solution containing identical amounts of metals. After slow drying at room temperature for at least 1 hour the monolith was further dried for at least 2 hours in 135° C. air. Finally, the catalyst was activated by 1 hour exposure to 427° C. air. This catalyst is referred to as Catalyst 15.

EXAMPLE 16

Another 205 g portion of the 860° C. air calcined alumina powder described in Example 15 was impregnated with 312 ml of nitrate solution containing 6.90 g of $Li_2O$ and 22.99 g of $CeO_2$. The resulting powder after homogenization, drying, and air calcination in exactly the same manner as described in Example 15, containing 3 wt. % $Li_2O$ and 10 wt. % $CeO_2$, had a surface area of 150 m$^2$/g.

A 40.0 g portion of the above lithia-ceria-alumina powder was wet ball milled for 20 hours with 125 g of water. The resulting slip containing 19.0 wt. % solid was double coated onto monolith pieces in the same fashion as described in Example 15. One of the 2.54 cm dia. × 2.54 cm long monoliths with 1.02 g lithia-ceria-alumina washcoat was converted to a Pt-Rh catalyst by dipping in the same manner as in Example 15, using the same metals loading. The resulting catalyst is referred to as Catalyst 16.

EXAMPLE 17

The two monolithic catalysts prepared in Examples 15 and 16 were subjected to accelerated pulsator aging for a period of 90 hours at approximately 60 pulses/minute, using n-hexane containing 0.053 g/liter Pb, 0.100 g/liter P, and 0.08 wt. % S. During the period of aging the catalyst samples were allowed to experience cycling temperatures. The cycle consisted of 70 minutes at 566° C. (at wall) and 20 minutes at 760° C. (at wall). Each catalyst sample was then evaluated by the "Perturbed Sweep Test" procedure described in Ind. Eng. Chem. Prod. Res. Dev., 21, 267 (1982), using the simulated exhaust gas feed shown in Table VIII.

TABLE VIII

| Simulated Auto Exhaust Gas Mixture for the "Perturbed Sweep Test" | |
|---|---|
| Gas | Vol. % |
| HC[a] | 0.0400 |
| CO | 0.295–0.80 |
| $H_2$ | 0.098–0.267 |
| NO | 0.185 |
| $SO_2$ | 0.0020 |
| $O_2$ | 0.245–0.725 |
| $CO_2$ | 14.5 |
| $H_2O$ | 10.0 |
| $N_2$ | balance |

[a] A mixture of $C_3H_6$ and $C_3H_8$ at $C_3H_6/C_3H_8 = 4/1$.

TABLE IX

| | | Performance of Pt—Pd—Rh Catalysts After 90-hr. Accelerated Pulsator Aging | | | | | | | | |
|---|---|---|---|---|---|---|---|---|---|---|
| Catalyst In | Promoters | Rich (R = 0.7) | | | Stoichiometric (R = 1.0) | | | Lean (R = 1.5) | | |
| Example | (Wt. %) | HC | CO | NO | HC | CO | NO | HC | CO | NO |
| 15 | $CeO_2$ | 77 | 46 | 71 | 80 | 60 | 64 | 82 | 70 | 34 |
| 16 | $Li_2O$—$CeO_2$ | 80 | 45 | 74 | 84 | 64 | 65 | 85 | 78 | 35 |

The results presented in Table IX again demonstrate that the Pt-Pd-Rh catalyst doubly promoted with lithia-ceria is superior to the other promoted with ceria only.

The following three examples demonstrate that the metals penetration depths have a significant effect on the performance of the TWC. In these examples $CeO_2$-promoted alumina beads were treated with lithium and Pt and Rh.

EXAMPLE 18

In this example a catalyst was prepared using the general impregnation sequence and materials as in Example 8 of the Toyota Japanese patent J56102940 (which is also identified as patent publication JP—04130) where the lithium was added after the noble metals.

A batch of Pt-Rh bead catalyst was prepared as follows: 300 ml of ceria-alumina beads identical to Support A in Example 1 was sprayed with 125 ml of aqueous solution containing 213.5 mg of Pt and 17.8 mg of Rh in the form of chloroplatinic acid and rhodium trichloride, respectively. The impregnating solution had a pH of 1.50. After 110° C. air drying and 1 hour air calcination at 500° C., the beads were sprayed again with 125 ml of aqueous lithium nitrate solution containing 2.89 g of $Li_2O$. The resulting beads were dried at 110° C. and activated by 1 hour reduction in flowing $H_2$ (5 vol. %)/$N_2$ at approximately 388° C. The metals loading (g metal/liter catalyst) in this catalyst is 0.712 Pt and 0.0593 Rh, respectively. The bead support consisted of 2.9 wt. % $CeO_2$, wt. % $Li_2O$, and balance $Al_2O_3$.

EXAMPLE 19

In this example, a catalyst was prepared with the same metals and promoter loadings as in Example 18. However, here the lithium is added with the noble metals and the noble metals are deposited using the preferred sulfito complex system according to the present invention.

A batch of Pt-Rh bead catalyst was prepared according to Procedure A as follows: 300 ml of ceria-alumina beads identical to Support A in Example 1 was sprayed with an aqueous solution which was prepared by dissolving 13.45 g of lithium nitrate (99% assay) in D.I. water, followed by adding 6 millimoles of dibasic ammonium citrate, 14.24 g of Solution B in Example 1, and diluting to 125 ml. This impregnating solution had a pH of 3.36. After 110° C. air drying, the beads were sprayed again with 119 ml of aqueous solution containing 4.5 mililimoles of dibasic ammonium citrate, 56.94 g of Solution B, and 8.90 g of Solution C in Example 1. The resulting beads were dried at 110° C. and activated by 1 hour reduction at approximately 388° C. in flowing $H_2$ (5 vol. %)$N_2$. The overall composition of this catalyst is identical to that in Example 18.

EXAMPLE 20

An 8.5 ml sample of each of the two bead catalysts prepared in Examples 18 and 19 was pulsator aged for a period of 90 hours in the same manner as in Example 17, except for the two changes made in aging conditions: The fuel, n-hexane, contained 0.132 g/liter Pb, 0.040 g/liter P, and 0.04 wt. % S. The aging unit wall temperature was allowed to cycle between 75 minutes at 566° C. and 15 minutes at 732° C. Each catalyst sample was evaluated before and after aging in the same manner as in Example 17. The results are set forth in Table X. All of the data shows the superiority of HC, CO and NO conversions both before and after aging for the catalyst made according to the present invention as compared to the catalyst made according to the procedure in the Toyota patent. The results compared in Table X clearly establishes the fact that the most important factor controlling the performance of pelleted TWCs is the metals penetration depth - or more precisely, the metals concentration profiles within the pellets.

TABLE X

| Catalyst in Example | Metals penetration Depth[a] | Before or After | Performance of Pt—Rh Catalysts Before and After 90-hr. Accelerated Pulsator Aging | | | | | | | | |
|---|---|---|---|---|---|---|---|---|---|---|---|
| | | | Rich (R = 0.7) | | | Stoichiometric (R = 1.0) | | | Lean (R = 1.5) | | |
| | | | HC | CO | NO | HC | CO | NO | HC | CO | NO |
| 18 | 520 | B | 84 | 67 | 81 | 88 | 78 | 68 | 87 | 87 | 45 |
| 18 | 520 | A | 76 | 46 | 73 | 76 | 58 | 56 | 76 | 70 | 35 |
| 19 | 265 | B | 90 | 73 | 89 | 92 | 85 | 76 | 91 | 92 | 54 |
| 19 | 265 | A | 82 | 50 | 78 | 83 | 63 | 62 | 82 | 78 | 40 |

[a]Estimates in microns are based on the determination under microscope using the $SnCl_2$ solution staining method.

It is understood that the foregoing detailed description is given merely by way of illustration and that many variations may be made therein without departing from the spirit of this invention.

What is claimed is:

1. A method of making a catalyst suitable for use as a three-way catalyst for auto emission control comprising the steps of
    (a) impregnating a calcined or activated alumina support with a cerous salt solution;
    (b) air drying and air calcining the impregnated support to obtain a ceria impregnated support;
    (c) impregnating the ceria impregnated support with solutions bearing platinum group metals in the form of sulfito complex ions and at least one alkali metal at a temperature below about 250° C. to form a catalyst;
    (d) air drying the catalyst a temperature of about 100°–150° C; and
    (e) activating the catalyst with hydrogen at a temperature of about 250°–550° C.

2. The method according to claim 1, wherein the calcined alumina of step (a) has been calcined at a temperature of about 950°–1050° C. and wherein step (b) comprises drying at a temperature of about 100°–150° C. followed by air calcination at a temperature of about 500°–800° C.

3. The method according to claim 1, wherein the calcined alumina of step (a) has been activated at a temperature of about 300°–600° C. and wherein step (b) comprises drying at a temperature of about 100°–150° C. followed by air calcination at a temperature of about 950°–1050° C.

4. The method according to claim 1, wherein the activating in step (e) is done at a temperature of about 400° C. for about 1 hour.

5. The method according to claim 1, wherein the amount of ceria impregnated is about 1–10 weight percent $CeO_2$.

6. The method according to claim 5, wherein the amount of ceria impregnated is about 2–6 weight percent $CeO_2$.

7. The method according to claim 1, wherein the alkali metal expressed as the oxide $M_2O$ is present in an effective amount of up to about 5 weight percent.

8. The method according to claim 1, wherein the impregnation in step (c) is done in multiple steps of impregnation.

9. The method according to claim 1, wherein the support is an alumina pellet.

10. The method according to claim 1, wherein the support is an alumina powder.

11. The method according to claim 1, wherein the alkali metal is sodium.

12. The method according to claim 1, wherein the noble metal is platinum, palladium, rhodium or mixtures thereof.

13. The method according to claim 12, wherein both platinum and palladium are present.

14. A catalyst made by the method of claim 1.

15. A method of making a catalyst which is suitable for use as a three-way catalyst for auto emission control comprising the steps of
    (a) impregnating an activated alumina support with a solution containing a cerous salt and a lithium salt;
    (b) air drying and air calcining the impregnated support to obtain a ceria-lithia impregnated support;
    (c) impregnating the ceria-lithia impregnated support with solutions bearing platinum group metals in the form of sulfito complex ions to form a catalyst;
    (d) air drying the catalyst at a temperature of about 100°–150° C.; and
    (e) activating the catalyst with hydrogen at a temperature of about 250°–550° C.

16. The method according to claim 15, wherein the activating in step (e) is done at a temperature of about 400° C. for about 1 hour.

17. The method according to claim 15, wherein the amount of ceria impregnated is about 1–10 wt. % $CeO_2$.

18. The method according to claim 17, wherein the amount of ceria impregnated is about 2–6 wt. % $CeO_2$.

19. The method according to claim 15, wherein the amount of lithia impregnated is up to about 5 wt. % $Li_2O$.

20. The method according to claim 19, wherein the amount of lithia impregnated is about 0.5-3 wt. % $Li_2O$.

21. The method according to claim 15 wherein the impregnation in step (c) is done in multiple steps of impregnation.

22. The method according to claim 15, wherein the support is an alumina pellet.

23. The method according to claim 15, wherein the support is an alumina powder.

24. A catalyst made by the method of claim 15.

25. A catalyst suitable for use as a three-way catalyst for auto emission control comprising a pelleted alumina support having impregnated thereon about 2-6% by weight of ceria as a promoter, up to about 5% by weight of an alkali metal oxide as a promoter, and a catalytically effective amount of noble metals, said noble metals penetrating the alumina support to a distance less than 300 microns as measured, by the $SnCl_2$ solution staining 26. A catalyst according to claim 25, wherein the alkali metal oxide is $Na_2O$.

27. A catalyst according to claim 25, wherein the alkali metal oxide is $Li_2O$.

* * * * *